United States Patent
Williams et al.

(10) Patent No.: US 9,403,205 B2
(45) Date of Patent: Aug. 2, 2016

(54) HELICAL COIL STEAM GENERATOR

(71) Applicant: NuScale Power, LLC, Corvallis, OR (US)

(72) Inventors: Dennis Keith Williams, Corvallis, OR (US); Douglas Paul Fassett, Corvallis, OR (US); Brent J. Webb, Corvallis, OR (US); William J. Bees, Corvallis, OR (US); Alex Scott Kruskamp, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 0 days.

(21) Appl. No.: 14/922,495

(22) Filed: Oct. 26, 2015

(65) Prior Publication Data

US 2016/0045947 A1    Feb. 18, 2016

Related U.S. Application Data

(60) Continuation of application No. 13/861,501, filed on Apr. 12, 2013, now Pat. No. 9,188,328, which is a division of application No. 12/939,957, filed on Nov. 4, 2010, now Pat. No. 8,752,510.

(51) Int. Cl.
| | |
|---|---|
| *B23P 15/26* | (2006.01) |
| *B21D 53/08* | (2006.01) |
| *F22B 29/06* | (2006.01) |
| *F22B 37/10* | (2006.01) |
| *F22B 37/20* | (2006.01) |
| *F22B 37/74* | (2006.01) |
| *B21D 53/02* | (2006.01) |
| *F22B 1/02* | (2006.01) |

(52) U.S. Cl.
CPC ............... *B21D 53/08* (2013.01); *B21D 53/02* (2013.01); *B23P 15/26* (2013.01); *F22B 1/023* (2013.01); *F22B 29/064* (2013.01); *F22B 37/104* (2013.01); *F22B 37/205* (2013.01); *F22B 37/74* (2013.01); *Y10T 29/49362* (2015.01); *Y10T 29/49364* (2015.01)

(58) Field of Classification Search
CPC ........ B21D 53/08; B21D 53/02; F22B 37/104; F22B 29/064; F22B 37/74; F22B 37/205; F22B 1/023; B23P 15/26; Y10T 29/49364; Y10T 29/49362
See application file for complete search history.

(56) References Cited

U.S. PATENT DOCUMENTS

| | | | | |
|---|---|---|---|---|
| 2,399,467 A | * | 4/1946 | Chandler | F22B 21/22 122/316 |
| 2,423,697 A | * | 7/1947 | Garfield | B21D 53/02 165/176 |
| 4,098,329 A | * | 7/1978 | Culver | F28D 7/1669 122/32 |
| 5,474,585 A | * | 12/1995 | Geibel | B01D 29/33 210/323.2 |
| 5,726,408 A | * | 3/1998 | Easterday | B23K 37/06 219/160 |

* cited by examiner

*Primary Examiner* — Sarang Afzali
*Assistant Examiner* — Ruth G Hidalgo-Hernande
(74) *Attorney, Agent, or Firm* — Lowe Graham Jones PLLC (57) ABSTRACT

A steam generator includes a lower integrated tubesheet and plenum (ITP) configured to receive feedwater and a first set of heat transfer tubes fluidly coupled to a plurality of stubs protruding from a first side of the lower ITP. A second set of heat transfer tubes fluidly couples to plurality of stubs protruding from a second side of the lower ITP. The first set of heat transfer tubes is coiled in a substantially clock-wise direction, and the second set of heat transfer tubes is coiled in a substantially counter-clockwise direction. The steam generator further includes an upper ITP fluidly coupled to the first and second set of heat transfer tubes, wherein the feedwater entering the lower ITP is converted to steam in the first and second sets of heat transfer tubes. The upper ITP is configured to transport the steam away from the steam generator.

18 Claims, 9 Drawing Sheets

HELICAL COIL STEAM GENERATOR

CROSS-REFERENCE TO RELATED APPLICATION

This patent application is a continuation of and claims priority to U.S. patent application Ser. No. 13/861,501, entitled HELICAL COIL STEAM GENERATOR, filed on Apr. 12, 2013, which is a divisional of, and claims priority to U.S. patent application Ser. No. 12/939,957, entitled HELICAL COIL STEAM GENERATOR, filed on Nov. 4, 2010. Both of the above referenced U.S. patent applications are incorporated herein by reference in their entirety.

TECHNICAL FIELD

The invention relates to the field of power generation, including systems designed to generate steam.

BACKGROUND

Power plants come in many different shapes and sizes. Large power plants can be used to provide electricity to a geographic area, whereas relatively small power plants can be used to power local areas or submarines or space craft, for example. In addition to providing electricity, power plants can be used for a myriad of additional or different purposes, from desalinating sea water to creating nuclear isotopes for medical purposes. Similarly, the types of power plants that are available cover a wide spectrum of technologies including gas powered, coal fired, and various types of nuclear power, to name a few.

One common feature between many of these power plants is the production of energy in the form of heat. Typically, the heat that is produced is ultimately used to convert water into steam. When the production of electricity is the desired goal, the steam is typically used to run a turbine. Regardless of the source of the heat, a heat transfer system is used to transfer the heat generated by the power plant to the water that is then converted to steam. In most nuclear power plants, a heat exchanger comprising a number of straight-through, once through, or U-shaped tubes is used to exchange the heat between a primary coolant circulating through the reactor core and a secondary coolant that is converted to steam.

The tubes are relatively simple to manufacture and install using mechanical methods of connecting the tubes to a tube sheet. The tubes are typically friction or pressure-fit to the tube sheet by roll-expanding a portion of the tubes within the tube sheet using a mechanical, pneumatic, or hydraulic device to provide a leak tight joint. However, by expanding the tubes, this causes a plastic deformation that leads to a weakened state of the tube wall and serves as a potential point of failure. Furthermore, the tube design requires a sufficient amount of surface area to provide the thermal efficiencies necessary to transfer the heat to the secondary coolant system. Accordingly, a corresponding amount of space must be provided to accommodate the resulting length of the tubes.

SUMMARY

A steam generator is herein disclosed as comprising a lower integral tubesheet/plenum (ITP) configured to receive feedwater and a first set of heat transfer tubes fluidly coupled to a plurality of stubs protruding from a first side of the lower ITP. A second set of heat transfer tubes fluidly couples to plurality of stubs protruding from a second side of the lower ITP. The first set of heat transfer tubes is coiled in a substantially clockwise direction, and the second set of heat transfer tubes is coiled in a substantially counterclockwise direction. The steam generator further includes one or more upper ITP fluidly coupled to the first and second set of heat transfer tubes, wherein the feedwater entering the lower ITP is converted to steam in the first and second sets of heat transfer tubes. The one or more upper ITPs are configured to transport the steam away from the steam generator.

Two or more independent tube bundles may be used to provide for redundant and independent steam generator operations. Feedwater and steam flows may be independently controlled to the independent bundles to allow for continued operation in the event of a failure of one of the steam generator bundles.

An apparatus is herein disclosed as comprising a means for receiving a source of feedwater and a means for fluidly coupling the means for receiving to a first set of heat transfer tubes coiled about a heat source in a first direction of rotation. The first tube bundle is configured to convert the feedwater into steam. The apparatus includes a means for fluidly coupling the means for receiving to a second set of heat transfer tubes coiled about the heat source in a second direction of rotation, wherein the first and second sets of heat transfer tubes comprise a plurality of tubes that cross over each other in alternating directions. The means for transporting the steam away from the heat source is fluidly coupled to the first and second sets of heat transfer tubes via a plurality of stubs protruding from one or more ITPs. The sets of tubes associated with a given ITP may constitute a bundle of heat transfer tubes for a steam generator.

A method of manufacturing a steam generator is herein disclosed. A portion of an ITP is removed to form a protruding stub having a height corresponding to the portion that is removed from the ITP, and a channel is formed that passes through the ITP and the tube stub. A tube is mounted to the stub so that one end of the tube faces a top edge of the stub, and the end of the tube is welded to the top edge of the stub. An inner radius of the tube is approximately equal to an inner radius of the stub such that the channel extends through the stub and into the end of the welded tube.

The invention will become more readily apparent from the following detailed description of a preferred embodiment of the invention which proceeds with reference to the accompanying drawings.

DETAILED DESCRIPTION

Various embodiments disclosed or referred to herein may be operated consistent, or in conjunction, with features found in co-pending U.S. application Ser. No. 11/941,024 which is herein incorporated by reference in its entirety.

Figure 1:
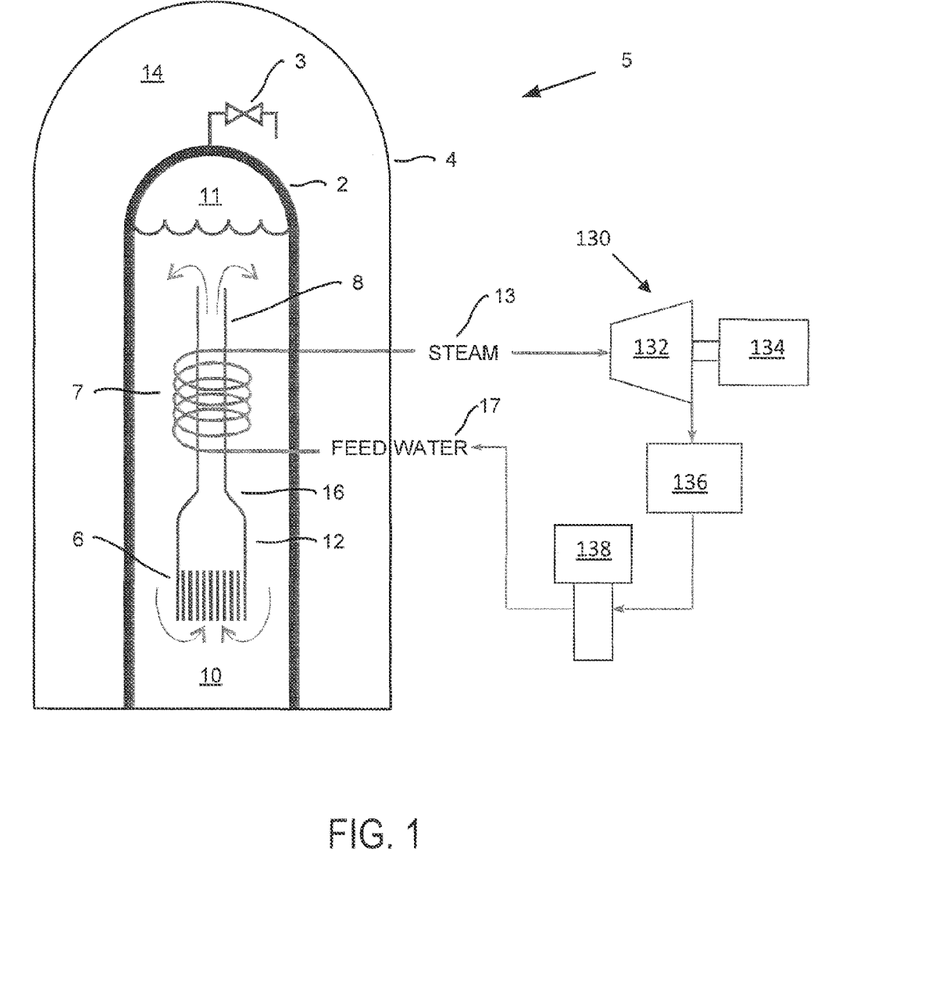
FIG. 1 illustrates an example nuclear power system including a secondary cooling system.

FIG. 1 illustrates an example nuclear power system 5 including a secondary cooling system 130. A reactor core 6 is surrounded by a reactor vessel 2. Primary coolant 10, such as water or sodium, in the reactor vessel 2 surrounds the reactor core 6. The reactor core 6 is further located in a shroud 12 which surrounds the reactor core 6 about its sides. When the primary coolant 10 is heated by the reactor core 6 as a result of fission events, the primary coolant 10 is directed from the shroud 12 and out of a riser 8. This results in further primary coolant 10 being drawn into and heated by the reactor core 6 which draws yet more primary coolant 10 into the shroud 12. The water 10 that is transmitted through the riser 8 is cooled down by a heat exchanger 7 and directed towards the annulus 16 and then returns to the bottom of the reactor vessel 2 through natural circulation.

The reactor vessel 2 is surrounded by a containment vessel 4. The containment vessel 4 is designed so that water or steam from the reactor vessel 2 is not allowed to escape into the surrounding environment. Pressurized steam 11 may be produced with heaters in the reactor vessel 2 as a means to maintain and to control the pressure in the reactor vessel. Water spray may be used in the top of the reactor vessel as an additional means to maintain and to control the pressure in the reactor vessel. A steam valve 3 is provided to vent steam 11 from the reactor vessel 2 into the containment vessel 4. In one embodiment, the reactor vessel 2 is surrounded in a partial vacuum. The partial vacuum outside the reactor vessel in the containment space may be used to reduce the presence of flammable gasses in the containment space and to produce an insulating space for the reactor vessel.

The heat exchanger 7 circulates feedwater 17 and steam 13 in the secondary cooling system 130 in order to generate electricity with a turbine 132 and generator 134. The feed water 17 passes through the heat exchanger 7 and becomes superheated. The secondary cooling system 130 may include a condenser 136 and optional feedwater pump 138. The steam 13 and feedwater 17 in the secondary cooling system 130 are isolated from the primary coolant in the reactor vessel 2, such that they are not allowed to mix or come into direct contact with each other. The primary coolant 10 circulates through the reactor vessel 2 as a result of temperature and pressure differentials that develop as a result of heat generation through reactor operation and through heat exchange with the secondary cooling system 130. Accordingly, the efficiency of the circulation depends on the thermal properties of the reactor module 5 as well as its physical design and geometry.

Figure 2:
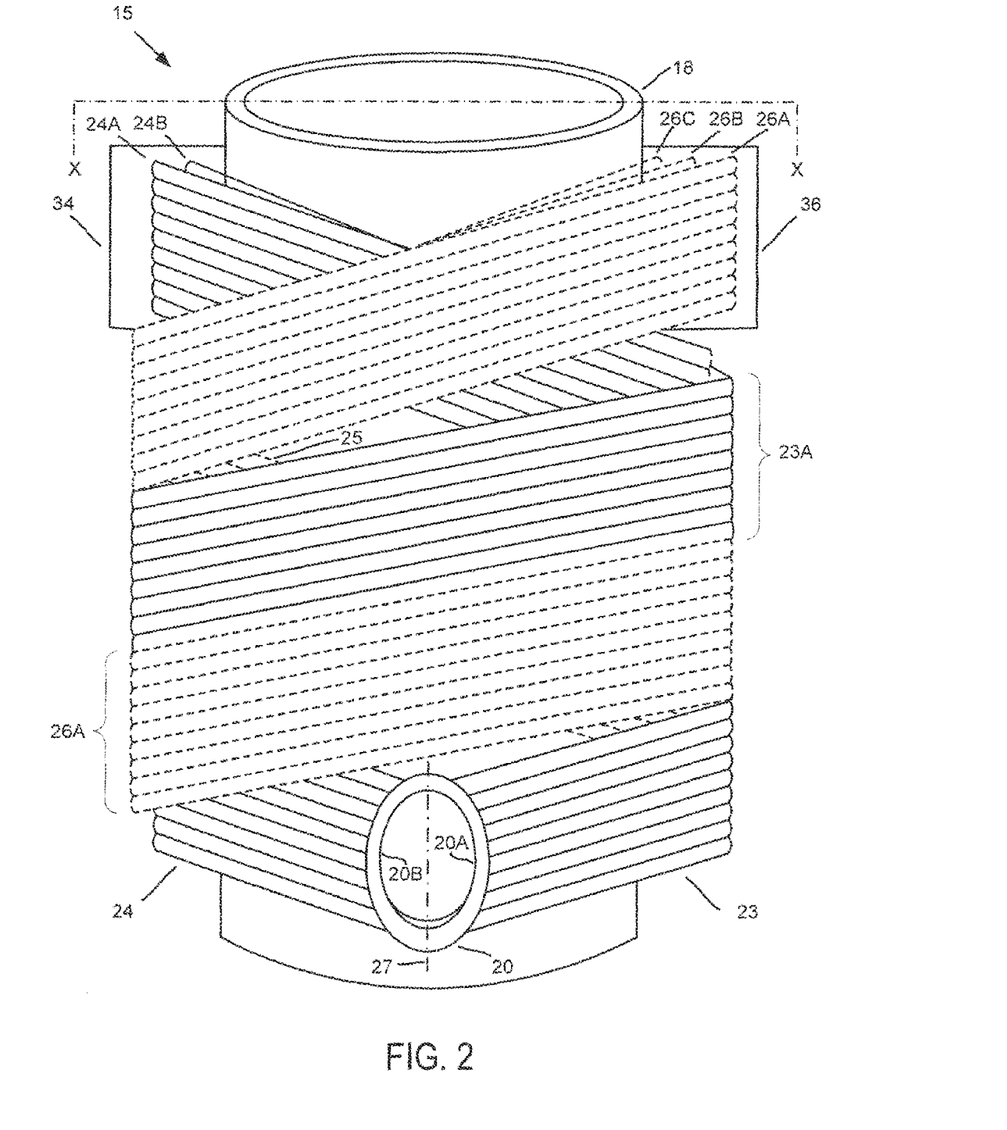
FIG. 2 illustrates an example heat transfer system 15 comprising a plurality of heat transfer tubes.

FIG. 2 illustrates an example steam generator or heat transfer system 15 comprising a plurality of heat transfer tubes. The heat transfer system 15 may include one or more steam generators, or bundles, comprising a lower ITP 20 configured to receive feedwater, and one or more upper ITPs 34, 36 configured to transport steam away from the reactor core, for example, to a turbine such as in the secondary cooling system 130 of FIG. 1. The lower ITP 20 and upper ITPs 34, 36 are shown mounted to a thermal housing 18. In one embodiment, the housing 18 comprises the riser 8 and/or annulus 16 of FIG. I through which the primary coolant 10 circulates past the reactor core 6. The integral steam generator and heat transfer system 15 may be located within a pressure vessel, such as reactor vessel 2 or containment vessel 4 of FIG. 1.

The lower ITP 20 is illustrated as including a first side 20A and a second side 20B. In one embodiment, first side 20A is a first tube sheet, whereas second side 20B is a second tube sheet. The lower ITP 20 is further illustrated as having an arcuate, circular, or elliptical shape. The lower ITP 20 includes a major axis 27 oriented in a vertical direction, wherein the first and second sides 20A and 20B are located on opposite sides of the axis 27. The one or more tubes sheets 20A, 20B may form an elliptical ITP 20. The first and second tube sets 23, 24 may be fluidly coupled to the elliptical ITP 20 on opposite sides of the major axis 27. A second lower ITP (not shown) may be included on a second and opposite side of the housing 18 as the lower ITP 20. Similarly, the second lower ITP may also include first and second sides as described above.

A first set of heat transfer tubes 23 is fluidly coupled to the first side 20A of the lower ITP 20. In one embodiment, the first set of heat transfer tubes 23 includes a plurality of tubes fluidly coupled to a plurality of stubs protruding from the first side 20A. The first set of heat transfer tubes 23 is shown coiled around the housing 18 in a substantially clockwise direction. For simplicity of illustration, the number of times the first set of heat transfer tubes 23 coils around the housing 18 is shown as being approximately one and three quarters, whereas in practice the number of coils may include several or any number of revolutions corresponding to the length, rotational diameter, and helical angle of the tubes.

A second set of heat transfer tubes 24 is fluidly coupled to the second side 20B of the lower ITP 20 opposite the first set of heat transfer tubes 23. In one embodiment, the second set of heat transfer tubes 24 includes a plurality of tubes fluidly coupled to a plurality of stubs protruding from the second side 20B. The second set of heat transfer tubes 24 is shown coiled around the housing 18 in a substantially counter-clockwise direction. For simplicity of illustration, the number of times the second set of heat transfer tubes 24 coils around the housing 18 is shown as being approximately one and one quarter, although other embodiments include fewer or more revolutions.

In one embodiment, the number of revolutions of the coils is between three and one quarter, and four and three quarters. Other embodiments may include fewer or more revolutions of the coils. The direction of rotation of the sets of coils may be in a different or opposite rotational sense.

The plurality of tubes may be formed using varying numbers or rotations about the central axis to minimize the variation in the lengths of the tubes as the location of the tubes transitions from inside columns to outside columns. The paths of the tubes may also be adjusted to help minimize the variations in the lengths of the tubes. The helical angles of the heat transfer tubes may vary to account for the different radial locations of the corresponding coils.

Having tubes of substantially equal length promotes a constant pressure drop and equal fluid flow through each tube/set and also minimizes or eliminates the need to orifice the heat transfer tubes to equalize pressure loss and flow redistribution. Minimizing the tube orificing allows for a broader range of optimal performance for heat extraction, and allows for future power up rates without replacement.

Whereas the lower ITP 20 is shown attached to a lower end of the housing 18, the upper ITPs 34, 36 are shown attached to an upper end of the housing 18. The second lower ITP (see FIG. 3, ref. 28) is also attached to the lower end of the housing 18. Heat exchange tubes connected to the second lower ITP are illustrated in FIG. 2 using dashed lines to distinguish from the heat exchange tubes shown in solid lines that are associated with the first bundle of heat transfer tubes 23, 24 connected to the lower ITP 20.

In one embodiment, the heat transfer tubes 23, 24 associated with the first lower ITP form a first steam generator bundle, whereas the heat transfer tubes 25, 26 associated with the second lower ITP 28 (FIG. 3) form a second steam generator bundle. A given steam generator bundle may comprise additional sets of heat transfer tubes, for example heat transfer tubes 25 or heat transfer tubes 26. In one embodiment, the additional sets of heat transfer tubes are connected to the ITP 28 (FIG. 3) on opposite sides of tube sheets, similar to that discussed for the connection of the heat transfer tubes to lower ITP 20.

Heat transfer tubes 24A and 24B (collectively heat transfer tubes 24) are shown connected to the same side of the upper ITP 34. Heat transfer tubes 26A, 26B, and 26C (collectively heat transfer tubes 26) are shown connected to the same side of upper ITP 36. The first set of heat transfer tubes 23 may be understood as connecting to an opposite side of the upper ITP 34 as the second set of heat transfer tubes 24. Similarly, a third set of heat transfer tubes 25 may be understood as connecting to an opposite side of the upper ITP 36 as a fourth set of heat transfer tubes 26.

The lower ITP 20 is fluidly coupled to the first and second sets of heat transfer tubes 30 23, 24. Secondary coolant or feedwater entering the lower ITP is converted to steam in the first and second sets of heat transfer tubes 23, 24. The one or more upper ITPs 34, 36 are configured to transport the steam away from the steam generator. The first set of heat transfer tubes 23 cross over the second set of heat transfer tubes 24 at an elevation between the lower ITP 20 and the upper ITP 36. The first upper ITP 34 may be fluidly coupled to both the first set of heat transfer tubes 23 and the second set of heat transfer tubes 24. The first set of heat transfer tubes 23 may be connected to the first upper ITP 34 on an opposite side from that of the second set of heat transfer tubes 24. The second upper ITP 36 may be fluidly coupled to both the third set of heat transfer tubes 25 and the fourth set of heat 5 transfer tubes 26. In one embodiment, the first upper ITP 34 is located on an opposite side of the steam generator as the second upper ITP 36. The second lower ITP 28 (FIG. 3) may be fluidly coupled to the second upper ITP 36 via both the third set of heat transfer tubes 25 and the fourth set of heat transfer tubes 26.

Primary coolant that passes through the reactor core 6 (FIG. 1) and up through the inside of housing 18 circulates back down around the outside of housing 18, similar to that described with respect to FIG. 1, and past the heat transfer tubes 23, 24, 25, 26. By nature of the crisscross arrangement of heat transfer tubes, the flow of primary coolant by and between the heat transfer tubes 23, 24, 25, 26 cascades past the alternating tubes to ensure consistent and even flow rates through the steam generator 15. The flow of primary coolant causes the secondary coolant flowing through the heat transfer tubes 23, 24, 25, 26, to heat up and turn to steam, as discussed above. By coiling the heat transfer tubes it is possible to increase a surface area of the tubes for a given axial cylinder in order to maximize the heat transfer from the primary coolant to the secondary coolant.

Figure 3:
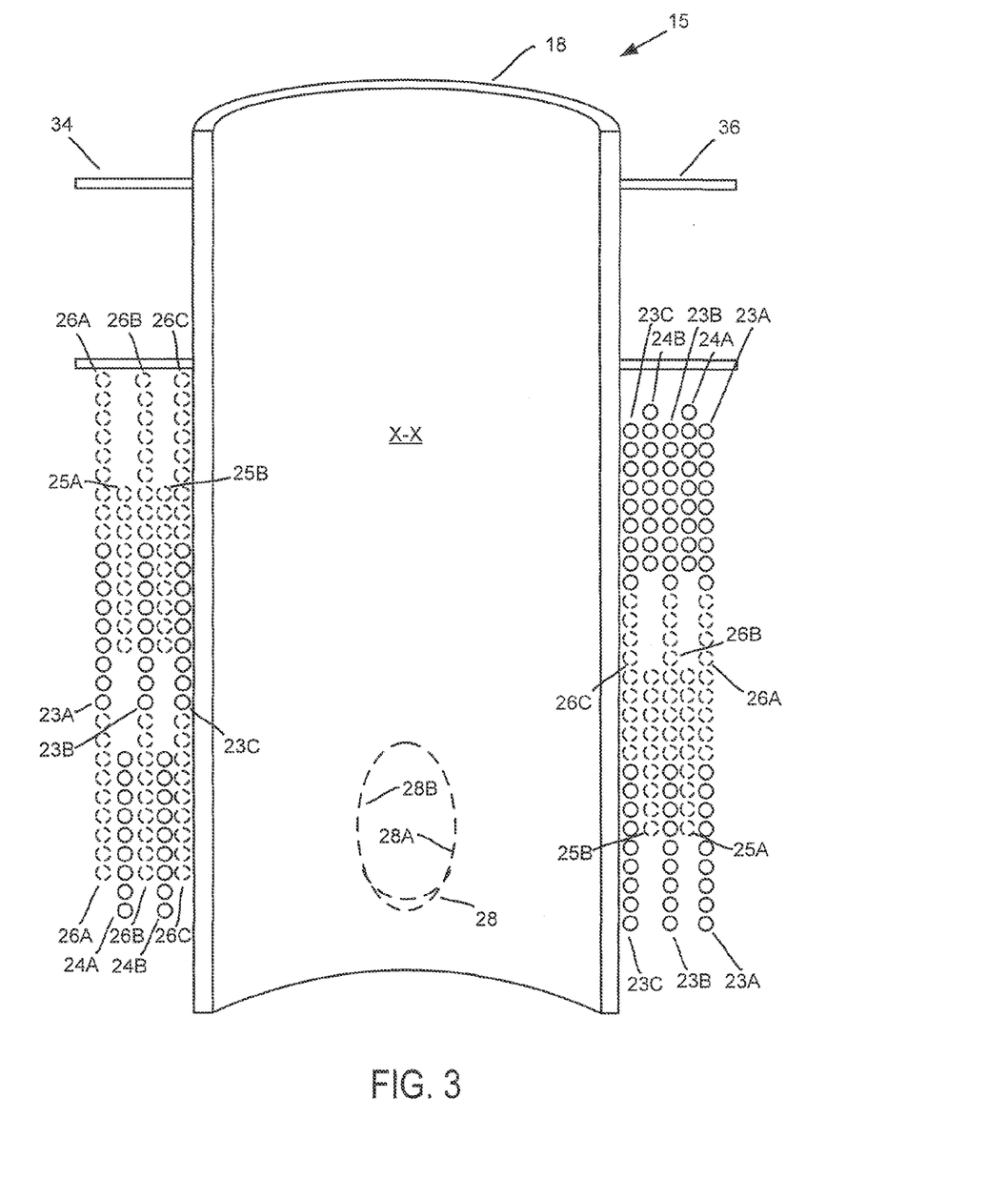
FIG. 3 illustrates a cross-section taken through the heat transfer system 15 of FIG. 2.

The first set of heat transfer tubes 23 is illustrated as including a row of heat transfer tubes 23A on the outside layer of the steam generator. Similarly, the fourth set of heat transfer tubes 26 is illustrated as including a row of heat transfer tubes 26A on the outside layer. The second and third sets of heat transfer tubes 24, 25 may be understood to have corresponding rows of heat transfer tubes which coil about the housing 18 in an opposite direction from rows 23A, and 26A. The rows of heat transfer tubes 23A, 26A may be understood to form the outside layer of the steam generator 15, whereas a next, inner layer of the steam generator 15 may be understood to be formed by corresponding rows of the second and third sets of heat transfer tubes 24A, 25A (FIG. 3). In one embodiment, the rows of heat transfer tubes 23A, 26A form adjacent rows of coils that rotate about the housing 18 in the same direction.

The elliptical shape of the ITP 20 allows for both horizontal and vertical attachment of the heat transfer tubes 23, 24. Orienting the ITP 20 in a substantially vertical direction allows for minimum wall thickness, and provides a hydrodynamic shape which minimizes pressure loss across the steam generator and reduces the cross section and impedance to the flow of primary coolant within the reactor vessel. Whereas the upper and lower ITPs are generally described as being oriented in a vertical direction, other embodiments include orienting the ITPs in a substantially horizontal direction.

The initial section of the tube sets 23, 24 may be connected to the lower ITP 20 at a steeper angle than intermediate portions of the coils, in order to provide sufficient clearance over the lower ITP(s). The tube sets 23, 24 may also include a portion having a relatively shallower angle to offset the steeper angled portion to reduce the differences between helical angles of the various coils.

FIG. 3 illustrates a cross-section x-x taken through the heat transfer system 15 of FIG. 2. Upper ITPs 34, 36 are illustrated as being connected to the housing 18 on opposite sides. Lower ITP 28 is illustrated with dashed lines as being connected on the back side of the housing 18, and as including first and second sides 28A and 28B, similar to that described above with respect to the first and second sides 20A, 20B of lower ITP 20.

Heat transfer tubes 23, 24 which originate in the lower ITP 20 (FIG. 2) are shown as solid circles, whereas the heat transfer tubes 25, 26 which originate in the lower ITP 28 are shown as dashed circles for purposes of clarity only. The cross-section x-x is intended to illustrate the crisscross nature of the varying layers or rows of heat transfer tubes that are coiled about the housing. For example, the first, inner-most, layer is shown as including heat transfer tubes 23C, 26C. The second layer is shown as including heat transfer tubes 24B, 25B. The third layer is shown as including heat transfer tubes 23B, 26B. The fourth layer is shown as including heat transfer tubes 24A, 25A. The outer layer is shown as including heat transfer tubes 23A, 26A. Of course, there may be fewer or more layers of heat transfer tubes than that shown in the illustration. In one embodiment, the heat transfer tubes comprise coils having alternating directions of rotation that cross over each other in coupling the lower ITP(s) 20, 28 to the upper ITP(s) 34, 36, respectively. For example, heat transfer tubes 26 alternately crisscross or cross over heat transfer tubes 25 in the following pattern: 26A, 25A, 26B, 25B, and finally 26C.

Whereas certain embodiments illustrated thus far have described two lower ITP and two upper ITP, other embodiments may include fewer or more lower and upper ITPs, and accordingly fewer or more sets of tubes or steam generators. In addition to maximizing the surface area for a given confined space, configuring the tubes as coils also causes liquid to be thrown to the outside of the tubes and therefore into closer proximity to the surrounding super-heated primary coolant which therefore promotes more efficient conversion of the feed water into steam.

Figure 4:
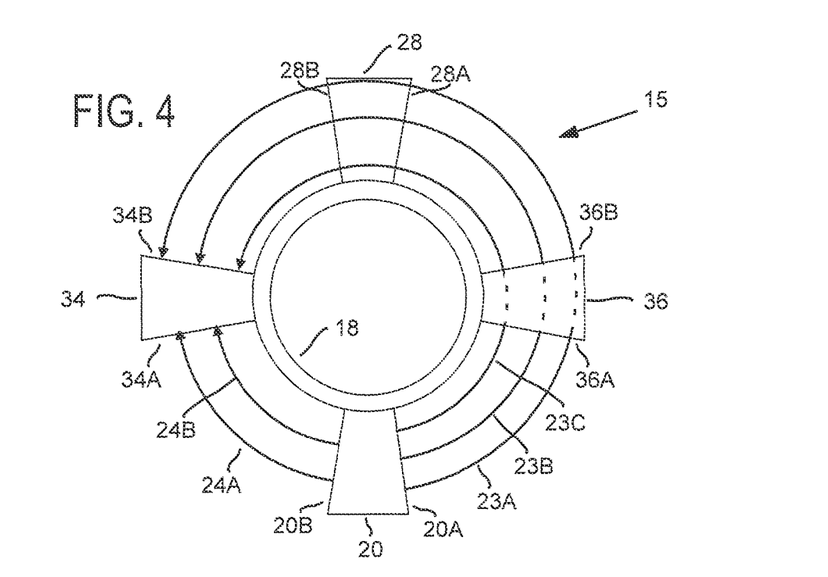
FIG. 4 is a top view of a heat transfer system comprising four integral tubesheets/plenums (ITPs).

FIG. 4 is a top view of the heat transfer system 15 comprising four ITPs. The rotating arrows correspond in number to the sets or rows of heat transfer tubes which originate in the first lower ITP 20. For example, heat transfer tubes 23A, 23B, and 23C which originate in the first side 20A of lower ITP 20, coil about the housing 18 in a counterclockwise direction, pass under upper ITP 36, pass over lower ITP 28 and eventually connect to upper ITP 34. In the illustrated embodiment, heat transfer tubes 23 connect to the second side 34B of the upper ITP 34. Similarly, heat transfer tubes 24A and 24B which originate in the second side 20A of lower ITP 20, coil about the housing 18 in a clockwise direction, and connect to upper ITP 34. In the illustrated embodiment, heat transfer tubes 24 connect to the first side 34A of the upper ITP 34.

For purposes of illustration and clarity, only the paths of heat transfer tubes which originate in lower ITP 20 are shown in FIG. 2. It should be understood that similar flow paths exist for heat transfer tubes which originate in lower ITP 28 and connect to sides 36A and 36B of the upper ITP 36. For example, the third set of heat transfer tubes 25 (FIG. 2) may connect the first side 28A of lower ITP 28 with the second side 36B of upper ITP 36. Similarly, the fourth set of heat transfer tubes 26 (FIG. 2) may connect the second side 28B of lower ITP 28 with the first side 36A of upper ITP 36.

Although the coils 23, 24 are shown as rotating about the housing 18 with one quarter and three quarter rotations, respectively, other embodiments include steam generators comprising heat transfer tubes which coil about the housing 18 a plurality of times. For example, coils 23 may rotate about housing 18 one and three quarters times, two and three quarters times, three and three quarters times, or more. Similarly, coils 24 may rotate about housing 18 one and one quarter times, two and one quarter times, three and one quarter times, or more. In one embodiment, the subsequent rows of coils 23, 24 form consecutive layers of heat transfer tubes which coil about the housing 18 in alternating, opposite directions.

Figure 5A:
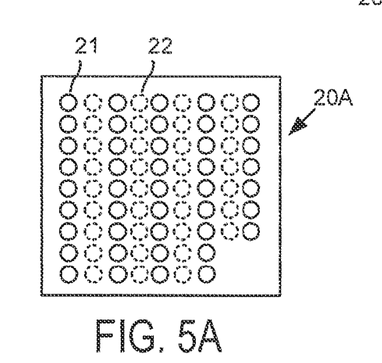
FIGS. 5A-D illustrate example tube sheets with varying channel configurations.
Figure 5B:
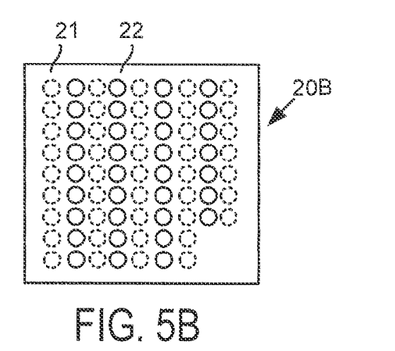

FIGS. 5A-D illustrate example tube sheets with varying channel configurations. One or more of the tube sheets may be understood to form a ITP. FIG. 5A shows the first side or tube sheet 20A comprising a plurality of rows (or columns) of steam generator tubes 21. Tubes 21 shown as solid circles are connected to the first tube sheet 20A, whereas tubes 22 shown as dashed circles are connected to the second, opposite side or tube sheet 20B (FIG. 5B). Heat transfer tubes 21, 22 are shown as alternating rows or columns. The "open" tube locations (e.g. dashed circles) increase spacing between tubes and therefore allows for ease of manufacturing.

Figure 5C:
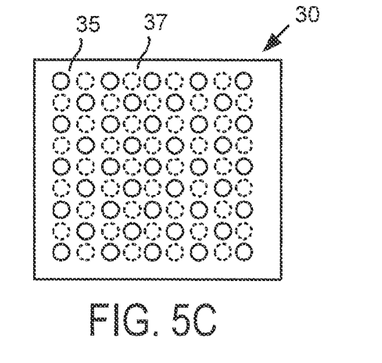

In FIG. 5B, tubes 22 are shown as solid circles indicating that they are connected to the second tube sheet 20B, whereas tubes 21 which are connected to the first tube sheet 20A are shown as dashed circles. The number of rows or columns associated with a tube set may be considerably more than those shown in the simplified illustrations. For example, in one embodiment there are approximately twenty rows or columns of tubes in a steam generator tube set. FIG. 5C illustrates an alternate embodiment of a tube sheet 30 which includes heat transfer tubes 35 connected to the tube sheet 30 in alternating positions. Heat transfer tubes 37 shown as dashed circles are connected to a second tube sheet (not shown) of the corresponding ITP. Every other tube location alternates between transfer tubes 35 and transfer tubes 37, in both the vertical and horizontal directions.

Figure 5D:
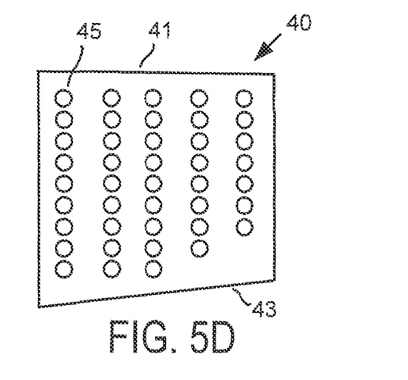

FIG. 5D illustrates an embodiment of a tube sheet 40 comprising heat transfer tubes 45 which are connected to the tube sheet 40 in columns having varying numbers of heat transfer tubes connected thereto. The tube sheet 40 is illustrated as comprising non-parallel sides 41 and 43. The number of tubes located on one side of the tube sheet 40 may be less than the number of tubes on the opposite side allowing the tube sheet to be tapered and therefore weight less than if the tube sheet was parallel. In one embodiment, an outer row comprises twenty two tubes, whereas an inner row comprises seventeen tubes.

Figure 6A:
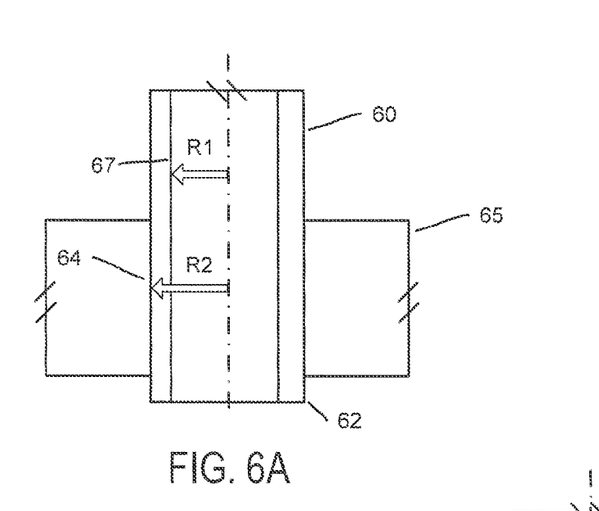
FIG. 6A illustrates a tube inserted into a conventional tube sheet.

FIG. 6A illustrates a tube 60 inserted into a conventional tube sheet 65. Tube 60 includes an inner radius R1 as measured to the inner surface 67 of the tube 60. The tube sheet 65 includes a through-hole having a radius R2. The inner radius R1 of the tube 60 is smaller than the radius R2 of the through-hole. An outer surface 64 of the tube 60 fits within the through-hole so that the tube 60 can be inserted into the tube sheet 65. The radius to the outer surface of the tube 60 is just slightly less than the radius R2. When connecting the tube 60 to the tube sheet 65, the lower end 62 of the tube 60 is inserted through the through hole until it projects out an opposite side of the tube sheet 65.

Figure 6B:
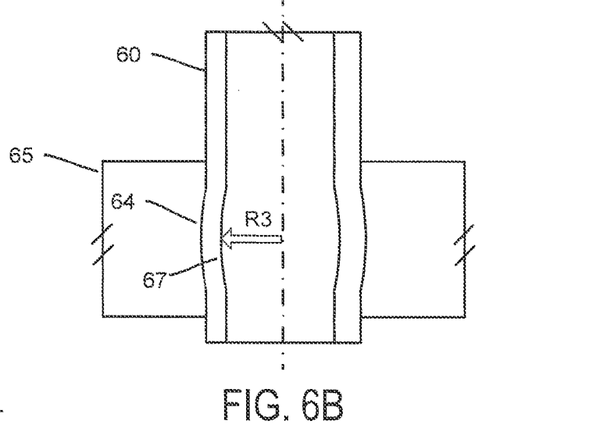
FIG. 6B illustrates a tube that has been plastically deformed within the conventional tube sheet of FIG. 6A.

FIG. 6B illustrates the tube 60 after it has been plastically deformed within the conventional tube sheet 65 of FIG. 6A. A pneumatic or hydraulic tool is placed within the tube 60 and then operated to press against the inner surface 67 of the tube 60. As the inner surface 67 is extended out to radius R3, the outer surface 64 is also extended into the surrounding wall of the through-hole to form a seal with the tube sheet 65. The radius R3 of the section of the deformed tube 60 is greater than the inner radius R1 of the rest of the tube, such that there is a slight bulge in the inner surface 67 of the tube 60.

Connecting the tube 60 to the tube sheet 65 in the manner described with reference to FIGS. 6A and 6B requires that the pressure of the liquid inside of the tube 60 is greater than the pressure of the liquid outside of the tube 60. If the inside pressure is instead less than the outside pressure, this could cause the friction seal, or pressure fitting, to fail. The protruding tube may be seal welded to ensure a leak tight joint.

Figure 7:
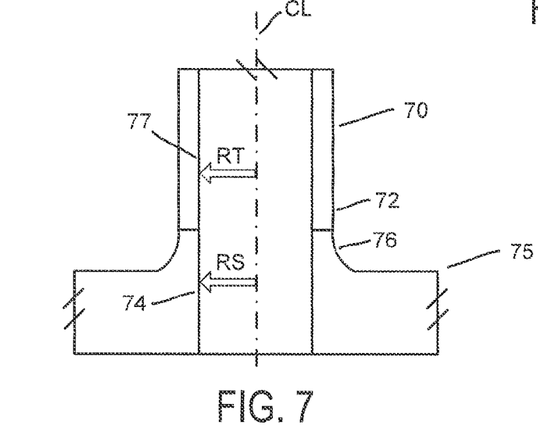
FIG. 7 illustrates a heat transfer tube connected to a tube sheet stub.

FIG. 7 illustrates a heat transfer tube 70 connected to a tube sheet 75 comprising a tube stub 76. The tube stub 76 may be formed integral to the tube sheet 75 or ITP. The lower end 72 of the tube 70 is connected to the stub 76. In one embodiment, the inner radius R T of the tube 70, as measured to the inner wall 77 of the tube 70, is the same as the inner radius RS of the through-hole of the tube sheet 75, as measured to an inner wall 74 of the tube sheet 75. The lower end 72 may be welded to stub 76 in order to fluidly connect the heat transfer tube 70 to the tube sheet 75.

After the tube 70 is connected to the tube sheet 75, the through-hole forms a continuous channel, having a uniform radius, through both the tube sheet 75 and the tube 70. For simplicity of illustration, the tube sheet 75 is shown as including a single stub 76, however it should be understood that the tube sheet 75 may comprise a plurality of stubs similar to stub 76 in any of a number of directions of the tube sheet 75.

Figure 8:
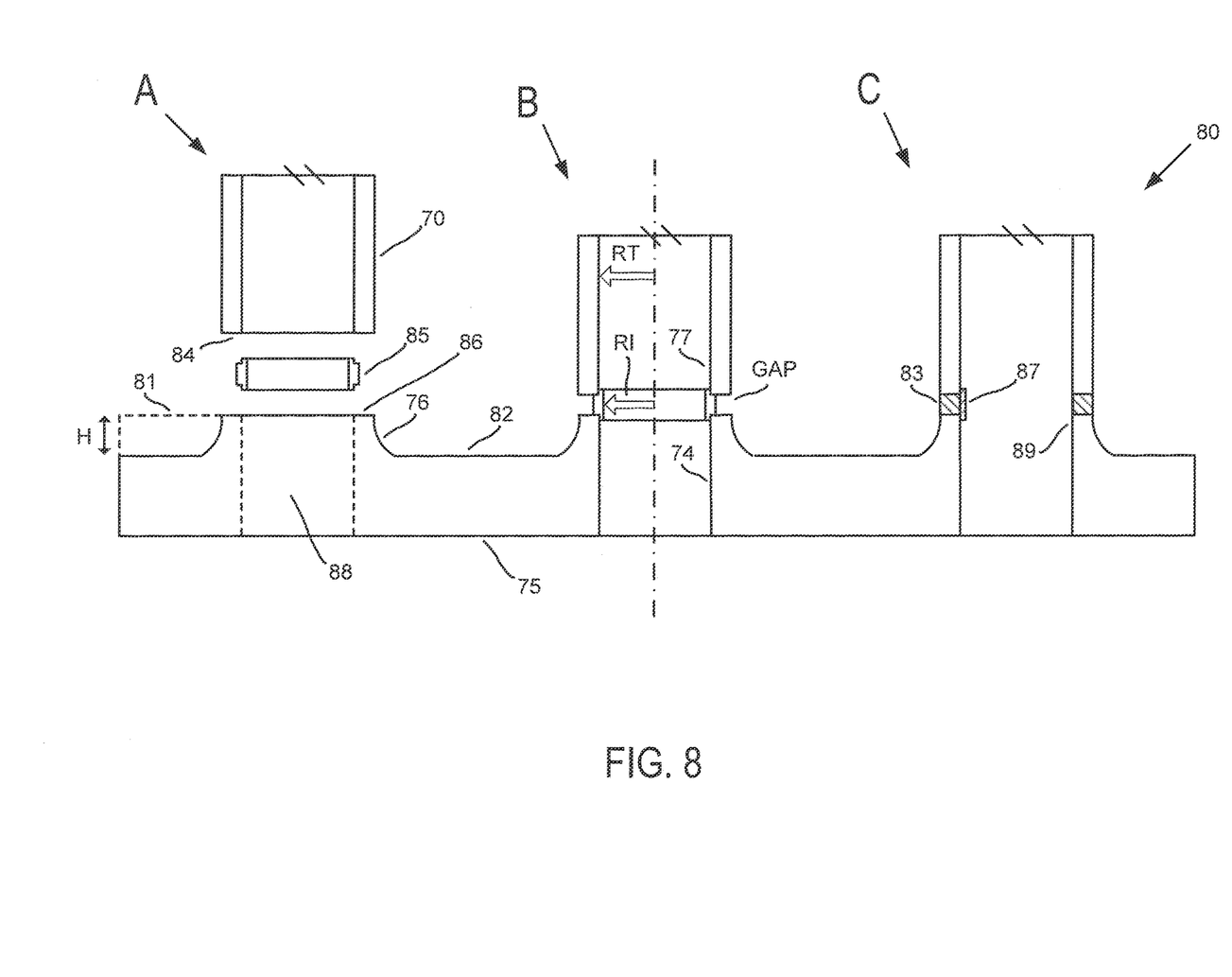
FIG. 8 illustrates a series of operations for mounting a heat transfer tube to a tube sheet comprising a plurality of protruding stubs.

FIG. 8 illustrates a series of operations for mounting a heat transfer tube 70 or plurality of heat transfer tubes to a tube sheet 80 comprising a plurality of protruding stubs 76. At operation A, a portion 81 of the tube sheet 80 is milled or otherwise removed to form a protruding stub 76 having a height H corresponding to the portion 81 that is removed from the tube sheet 75. The overall thickness of the tube sheet 75 or ITP may initially be greater than conventional tube sheets to account for the removed portion 81.

The channel 88 that passes through the tube sheet is formed either before or after making the protruding stub 76. In one embodiment, the channel 88 is formed by machining a hole through the tube sheet 75. The channel 88 may be formed at a perpendicular angle to the tube sheet, or at an angle corresponding to a non-vertical mounting angle of the end of the tube 70.

The tube 70 may be mounted to the stub 76 so that one end 84 of the tube 70 faces a top edge 86 of the stub 76. In one embodiment, a mounting insert 85 is located between the end 84 of the tube 70 and the top edge 86 of the stub 76. The top edge 86 of the stub 76 is located above the upper face 82 of the tube sheet 75 from which the portion 81 was removed.

At operation B, the tube 70 and stub 76 are aligned by locating the insert 85 between the stub 76 and the tube 70. The insert 85 may be configured to provide a gap between the tube 70 and the stub 76 that controls a placement or amount of welding. The insert 85 may also be configured to provide a backing plate for the weld, for example to avoid blowing a hole through the wall of the tube 70 and/or stub 76. The inner radius RT of the tube 70 is measured to the inner wall 77 of the tube 70. In one embodiment, the insert 85 has a throughhole having an inner radius RI that is smaller than the inner radius RT of the tube 70.

At operation C, The end 84 of the tube 70 is welded to the top edge 86 of the stub 76. The tube 70 may be electron beam (EB) or fusion welded to the stub 76. The welding material 83 may completely fill in the gap located between the end 84 of the tube 70 and the top edge 86 of the stub 76. An inner portion 87 of the insert 85 that is located in the channel 88 may be ground away or otherwise removed after welding the tube 70 to the stub 76, such that the channel 88 extends into the end of the welded tube 70 as a continuously smooth surface 89. Similarly, the inner radius RT of the tube 70 may be approximately equal to an inner radius of the stub 76 such that the channel 88 extends through both the stub 76 and the welded tube 70 having a common inner radius. The welded portion 83 of the channel may be as strong or stronger than the rest of the tube 70, and is considered to be a structural weld joint, as opposed to being merely a welding seal that is designed to prohibit liquid penetration. Of course, the welded portion 83 also prohibits any liquid from leaking through or between the joint.

The formation of the protruding stub 76 itself aids in welding the tube 70 to the tube sheet 75. By forming a stub 76 having approximately the same wall thickness as the end of the tube 70, heat is evenly transferred to both the tube 70 and stub 76 during the welding process. This improves the weld as compared to, for example, welding the tube 70 directly to the tube sheet surface 82 or 75, in which case the relatively thicker tube sheet 75 would tend to draw the heat away from the point of welding.

In another embodiment, the tube 70 is welded to the stub 76 from the inside of the channel 88, for example via access from the side of the tube sheet 75 opposite the surface 82. When the tube sheet 75 is formed into an ITP, this may entail welding the tube 70 to the stubs from within the interior of the ITP. In some embodiments, a combination of inner and outer welds may be used on different tubes, depending on their accessibility during the manufacture process.

Figure 9:
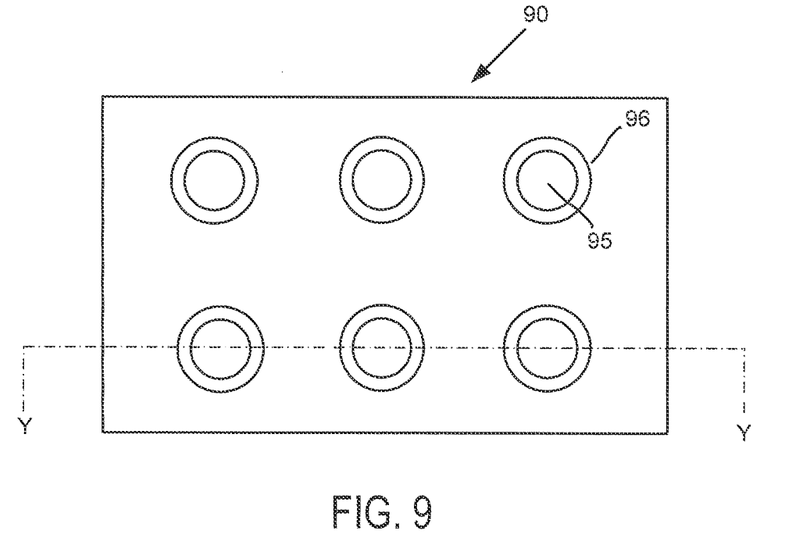
FIG. 9 illustrates a top view of a tube sheet.

FIG. 9 illustrates a top view of a tube sheet 90. Tube sheet 90 may comprise a plurality of stubs 96 having channels 95 formed there-through. Whereas the tube sheet 90 is shown as a sheet or flat plate, this is for illustrative purposes only, and it should be understood that the tube sheet 90 may be formed as a circular or elliptical ITP as previously described. The ITP may be formed of one or more tube sheets.

Figure 10:
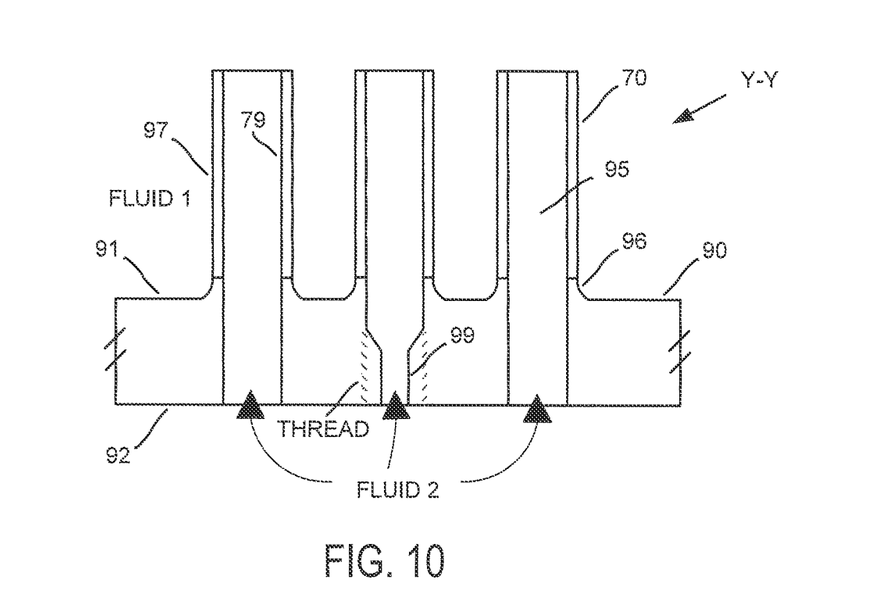
FIG. 10 illustrates a cross section of the tube sheet of FIG. 9 fluidly connected to a plurality of heat transfer tubes.

FIG. 10 illustrates a cross section Y-Y of the tube sheet 90 of FIG. 9 fluidly connected to a plurality of heat transfer tubes 70. The tube sheet 90 may form part or all of a ITP which provides a means for receiving a source of feedwater, or secondary coolant, identified as FLUID 2. The stubs 96 may provide a means for fluidly coupling the ITP to a first tube set including the plurality of tubes 70. The tubes 70 may then be coiled about a heat source in a first direction of rotation, similar to that shown in FIG. 2. The first tube set of tubes 70 may be configured to convert the feedwater into steam when superheated primary coolant FLUID 1 passes by or over the outside surface of the tubes 70.

The plurality of stubs 96 may be integrally formed from the one or more tube sheets 90. In one embodiment, the plurality of tubes 70 are welded to the plurality of stubs 96 on a first side 91 of the tube sheet 90, or same side of the tube sheet 90 as the tubes 70 are located. The first side 91 of the tube sheet 90 may be in direct contact with the primary coolant FLUID 1. The second side 92 of the tube sheet 90 may be in direct contact with the feedwater or secondary coolant FLUID 2. The tube sheet 90 operates to keep the primary coolant FLUID 1 on the first side 91 of the tube sheet 90. The plurality of tubes 70 may be welded or otherwise fluidly coupled to the stubs 96 in order to keep the FLUID 1 separated from FLUID 2. In certain cases, it may be desirable to keep the FLUID 1 isolated from the FLUID 2, for example, where FLUID 1 contains radioactive or contaminated material, or where the mixture of FLUID 1 and FLUID 2 may result in an adverse or combustible reaction such as for some liquid metal (e.g. sodium) reactors.

The primary coolant FLUID 1 acts to heat up the secondary coolant FLUID 2 as it passes through the channels 95 within the plurality of tubes 70 in order to convert the secondary coolant FLUID 2 into steam. Whereas an inner surface 79 of the plurality of tubes 70 is exposed to the secondary coolant FLUID 2, the outer surface 97 of the plurality of tubes 70 is exposed to the primary coolant FLUID 1. The pressure of the primary coolant FLUID 1 may be greater than the pressure of the secondary coolant FLUID 2. In one embodiment, the pressure of the primary coolant FLUID I is nearly four times greater than the pressure of the secondary coolant FLUID 2.

Orifices 99 may be used to equalize and control the flow of a secondary coolant FLUID 2, or feedwater, through the heat transfer tubes 70. The orifices 99 may be sized to ensure the flow through each of the heat transfer tubes 70 is similar, or equal, for all tubes 70. The orifices 99 may be sized to ensure that heat transfer to the fluid inside the tubes 99 is similar, or equal, for all tubes 70. In addition, the orifices 99 may be sized to reduce back pressure or back flow and to thus stabilize the flow through all of the heat transfer tubes 70. The orifices 99 may be included for some or all of the tubes 70. In some embodiments, the orifices are placed within the tube sheet 90. The portion of the channel 95 within the tube sheet 90 may be threaded for installing the orifices 99.

Figure 11:
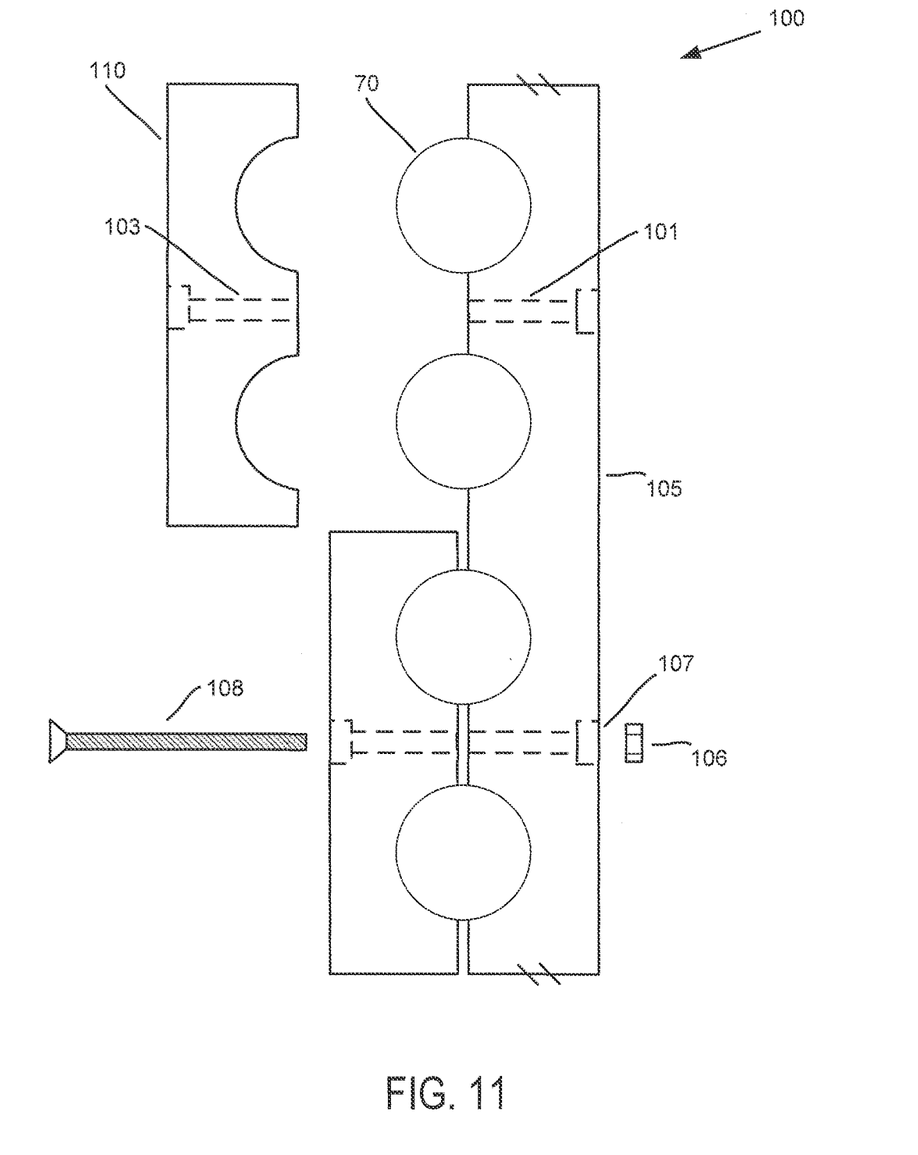
FIG. 11 illustrates a tube mounting structure.

FIG. 11 illustrates a tube mounting structure 100 for mounting or supporting the heat transfer tubes 70 of a steam generator. The tube mounting structure 100 comprises a main strut 105 configured to constrain the plurality of heat transfer tubes 70 in both a radial direction and a vertical direction. The tube mounting structure 100 further comprises a plurality of inner struts 110 which are configured to mount to the main strut 105 and bracket two adjacent heat transfer tubes 70. The plurality of inner struts 110 constrain the plurality of heat transfer tubes 20 in substantially the vertical direction.

A screw or bolt 108 is inserted through holes 101 and 103 of the main strut 105 and the inner struts 110, respectively. A nut 106 is used to secure the bolt 108 to the tube mounting structure 100. The nut 106 may be configured to self-lock with the bolt to prohibit inadvertent loosening of the bolt 108 within the tube mounting structure during operation of the steam generator. The main strut 105 may form a continuous piece of mounting structure that extends between the upper and lower ITPs (FIG. 2). The main strut 105 and inner struts 110 may be configured to mount to heat transfer tubes 70 having varying helical angles in connecting the upper and lower ITPs.

The tube mounting structure 100 may be manufactured out of similar or the same material as the heat transfer tubes 70 to minimize any difference in thermal expansion. During operation, as the heat transfer tubes 70 thermally expand, the tube mounting structure 100 is configured to cause the heat transfer tubes 70 to seat into the main strut 105 which further reduces the effects of vibration on the tubes 70.

Figure 12:
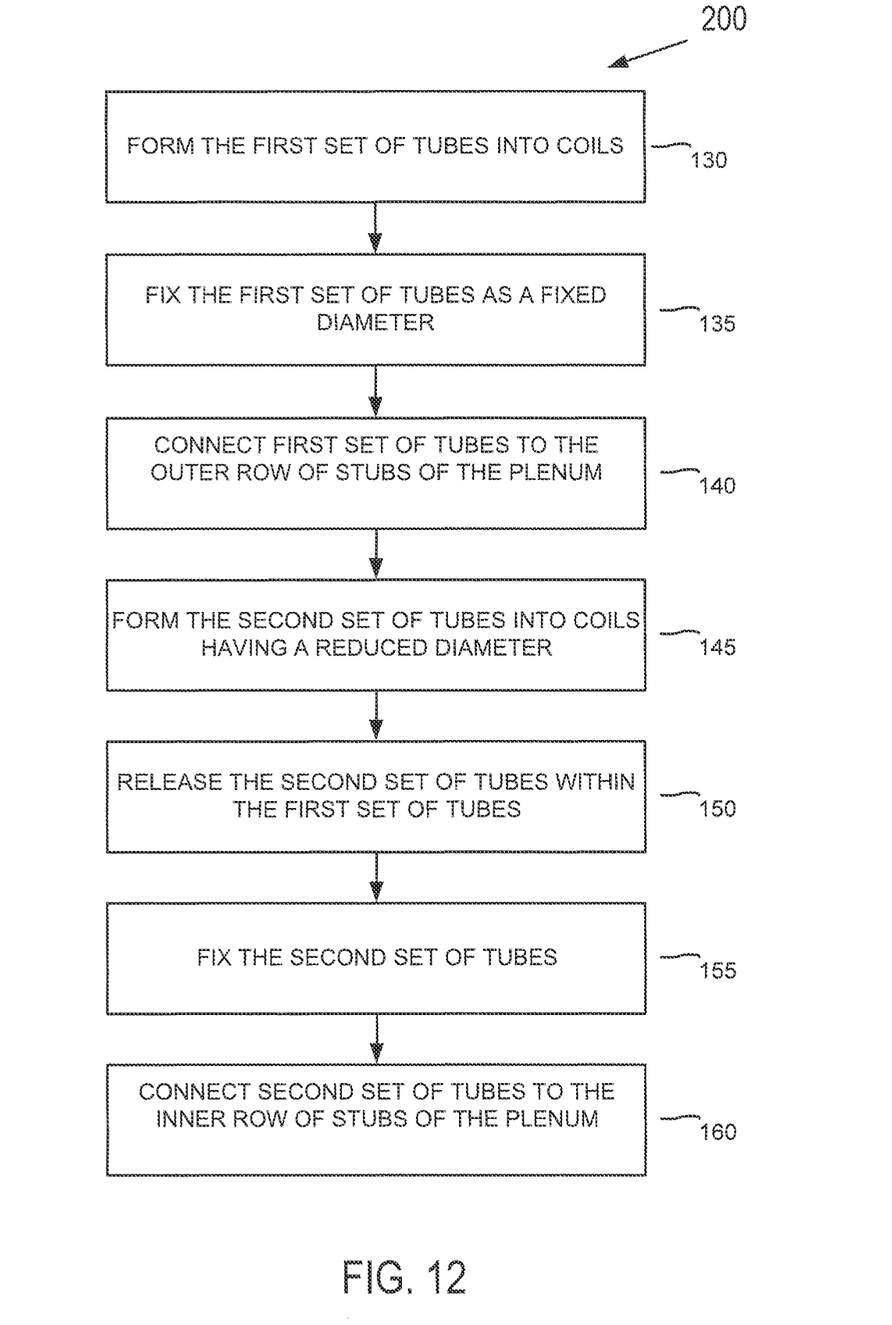
FIG. 12 illustrates an example method of manufacturing a steam generator.

FIG. 12 illustrates an example method 200 of manufacturing a steam generator comprising a tube sheet or ITP which includes rows of stubs. The stubs comprise both an inner row of stubs and an outer row of stubs. It should be understood that there may be any number of rows of stubs in addition to the inner and outer rows described herein. The first tube sheet may be formed into one half of an elliptical ITP and a second tube sheet may be formed into another half of the elliptical ITP. The two tube sheets may be connected together to form a single ITP. In one embodiment, the heat transfer tubes are substantially straight prior to being operated on in the below method.

At operation 130, a first set of tubes are coiled. The first set of tubes may be coiled about a heat source, or about a housing which surrounds the heat source. The first set of tubes may be coiled in either a clockwise or counter-clockwise sense of rotation. The number of coils may include a plurality of revolutions about the heat source including fractions of rotations.

At operation 135, the first set of tubes are formed into a number of coils having a fixed diameter. The diameter of the coils may be fixed by mounting the first set of tubes in a mounting structure.

At operation 140, the first set of tubes are connected to the outer row of stubs on the ITP. The first set of tubes may be welded to the stubs. The first set of tubes may be associated with a tube set fluidly coupled to the first tube sheet or first side of the ITP.

At operation 145, a second set of tubes are formed into a number of coils having a diameter less than that of the diameter associated with the coils of the first set of tubes. The number of coils of the second set of tubes may be equal to the number of coils of the first set of tubes. Whereas the first set of tubes may be coiled in a first direction, the second set of tubes may be coiled in a second direction.

The first and second sets of tubes may comprise coils having alternating directions of rotation that cross over each other during a number of revolutions before being connected to one or more additional tube sheets. The first and second set of tubes may be coiled to form three or more revolutions. In one embodiment, the second set of tubes are coiled in an opposite direction of rotation as the coils in the first set of tubes.

At operation 150, the second set of tubes are released within the first set of tubes. The second set of tubes may initially be torqued to a reduced diameter prior to being placed within the first set of tubes. Temporary fasteners may be applied to the second set of tubes in the reduced diameter configuration, which are then released after the second set of tubes are placed within the first set of tubes. The coils may be allowed to expand in diameter towards the first set of tubes. The first and second set of tubes may be connected to a second tube sheet. In one embodiment, the second set of tubes are preset with a reduced diameter as compared to the first set of tubes such that the torquing is not required during insertion of the second set of tubes within the first set of tubes.

One or both of the tube sets that are located adjacent to each other and that rotate in the same direction (such as tubes 23A and 26A of FIG. 2) may be torqued to a reduced diameter, and then released, during installation in order to locate the tube sets between or next to each other. In this case, it may be desirable to have the resulting tubes have the same diameter after tubes are released.

At operation 155, the second set of tubes are fixed at a smaller diameter than the first set of tubes. The diameter of the coils may similarly be fixed by mounting the second set of tubes in a mounting structure. In one embodiment, the second set of tubes are not allowed to contact the first set of tubes, and instead are kept spaced apart from each other by the mounting structure.

At operation 160, the second set of tubes are connected to the inner row of stubs of the ITP.

Although the embodiments provided herein have primarily described a pressurized water reactor, it should be apparent to one skilled in the art that the embodiments may be applied to other types of power systems as described or with some obvious modification. For example, the embodiments or variations thereof may also be made operable with a boiling water reactor, sodium liquid metal reactor, pebble-bed reactor, or a reactor designed to operate in space, such as in a propulsion system with limited operational space. Whereas certain embodiments describe use of the helical coil steam generator in a nuclear reactor, the steam generator could also be made to operate with a conventional steam generating power facility. Similarly, the steam generators can be configured to operate with either natural or forced circulation.

Any rates and values described herein are provided by way of example only. Other rates and values may be determined through experimentation such as by construction of full scale or scaled models of a nuclear reactor fluid system.

Having described and illustrated the principles of the disclosure in a preferred embodiment thereof, it should be apparent that aspects may be modified in arrangement and detail without departing from such principles. We claim all modifications and variation coming within the spirit and scope of the following claims.

What is claimed is:

1. A method of manufacturing a steam generator, comprising:
    removing a portion of a tube sheet to form a first plurality of stubs that protrude from the tube sheet; forming a first plurality of channels, wherein each of the first plurality of channels passes through the tube sheet and a corresponding stub of the first plurality of stubs;
    forming a first plurality of tubes into a first tube coil having a first diameter;
    connecting the first plurality of tubes to the first plurality of stubs, wherein an inner radius of each of the first plurality of tubes is approximately equal to an inner radius of each of the first plurality of stubs such that the first plurality of channels extend through the first plurality of stubs and into the first plurality of tubes;
    removing another portion of the tube sheet to form a second plurality of stubs that protrude from the tube sheet;
    forming a second plurality of channels, wherein each of the second plurality of channels passes through the tube sheet and a corresponding stub of the second plurality of stubs;
    forming a second plurality of tubes into a second tube coil having a second diameter, the second diameter being less than the first diameter;

positioning the second tube coil inside the first tube coil; and connecting the second plurality of tubes to the second plurality of stubs.

2. The method of manufacture according to claim 1, further comprising:

forming the tube sheet into one half of an elliptical integrated tube sheet and plenum (ITP), wherein the first plurality of stubs are located on the one half;

connecting the first plurality of tubes to the first plurality of stubs located on the one half;

forming a second tube sheet into another half of the elliptical ITP, wherein a second plurality of stubs is located on the other half; and connecting a second plurality of tubes to the second plurality of stubs located on the other half.

3. The method of manufacture according to claim 2, further comprising:

coiling the first plurality of tubes in a first direction; and coiling the second plurality of tubes in a second direction, wherein the first and the second plurality of tubes comprise coils having alternating directions of rotation that cross over each other during a number of revolutions before being connected to another tube sheet.

4. The method of manufacturing according to claim 1, further comprising:

aligning a tube of the first plurality of tubes and a stub of the first plurality of stubs by locating an insert between a top edge of the stub and an end of the tube, wherein the insert provides a gap between the tube and the stub that controls a placement of a welding that connects the tube to the stub; and removing an inner portion of the insert located in a channel of the first plurality of channels such that the channel extends into the end of the welded tube as a substantially smooth surface.

5. The method of manufacture according to claim 1, wherein forming the first plurality of channels comprises machining at least a portion of the first plurality of channels at an angle corresponding to a non-vertical mounting angle of an end of at least a portion of the first plurality of tubes.

6. The method of manufacture according to claim 1, wherein the first and the second plurality of tubes are coiled to form one or more revolutions, and wherein the method further comprises connecting the first and the second plurality of tubes to a second tube sheet.

7. A method of manufacturing a steam generator, comprising:

removing a portion of a tube sheet to form an inner row of stubs and an outer row of stubs;

forming a plurality of channels such that each channel of the plurality of channels passes through the tube sheet and a corresponding stub of the inner row of stubs or the outer row of stubs;

coiling a first set of tubes;

fixing the first set of tubes in a fixed diameter;

connecting the first set of tubes to the outer row of stubs;

coiling a second set of tubes;

releasing the second set of tubes within the first set of tubes; and connecting the second set of tubes to the inner row of stubs.

8. The method of manufacture according to claim 7, further comprising:

aligning the first set of tubes and the outer row of stubs by locating an insert between an axial edge of a stub of the outer row of stubs and an end of a tube of the first set of tubes to create a gap between the end of the tube and the axial edge of the stub.

9. The method of manufacture according to claim 8, wherein a shape of the insert is configured to create the gap between the end of the tube and the axial edge of the stub.

10. The method of manufacture according to claim 8, wherein the insert has a T-shaped cross section.

11. The method of manufacture according to claim 7, wherein the first and the second set of tubes are coiled to form one or more revolutions, and wherein the method further comprises connecting the first and the second set of tubes to a second tube sheet.

12. The method of manufacture according to claim 7, further comprising:

forming the tube sheet into one half of an elliptical integrated tube sheet and plenum (ITP);

mounting a first set of tubes into the one half;

forming a second tube sheet into another half of the elliptical ITP; and mounting a second set of tubes into the other half.

13. The method of manufacture according to claim 7, further comprising:

coiling the first set of tubes in a first direction; and coiling the second set of tubes in a second direction, wherein the first set of tubes and the second sets of tubes comprise coils having alternating directions of rotation that cross over each other during a number of revolutions before being connected to one or more additional tube sheets.

14. The method of manufacture according to claim 7, wherein an inner radius of the first set of tubes and the second set of tubes is equal to an inner radius of the inner row of stubs and the outer row of stubs such that each of the plurality of channels extend through the corresponding stub of the inner row of stubs or the outer row of stubs and a corresponding tube of the first set of tubes or the second set of tubes.

15. The method of manufacture according to claim 7 wherein connecting the first set of tubes to the outer row of stubs includes:

mounting each of the first set of tubes to a corresponding stub of the outer row of stubs such that an end of each of the first set of tubes faces a top edge of the corresponding stub; and welding the end of each of the first set of tubes to the top edge of the corresponding stub.

16. A method of manufacturing a steam generator, comprising:

forming a first set of tubes into a first tube coil having a first diameter by applying a torque to the first tube coil to form the first set of tubes into the first tube coil having the first diameter;

releasing the torque from the first tube coil to allow coils of the first tube coil to expand to a second diameter that is greater than the first diameter; and connecting the first set of tubes to a first row of stubs protruding from a tube sheet.

17. The method of manufacture according to claim 16, further comprising:

forming a second set of tubes into a second tube coil having a third diameter, the third diameter being less than the first diameter;

positioning the second tube coil inside the first tube coil; and connecting the second set of tubes to a second row of stubs protruding from the tube sheet.

18. The method of manufacture according to claim 16, further comprising mounting the first tube coil around a heat source.

\* \* \* \* \*